UNITED STATES PATENT OFFICE.

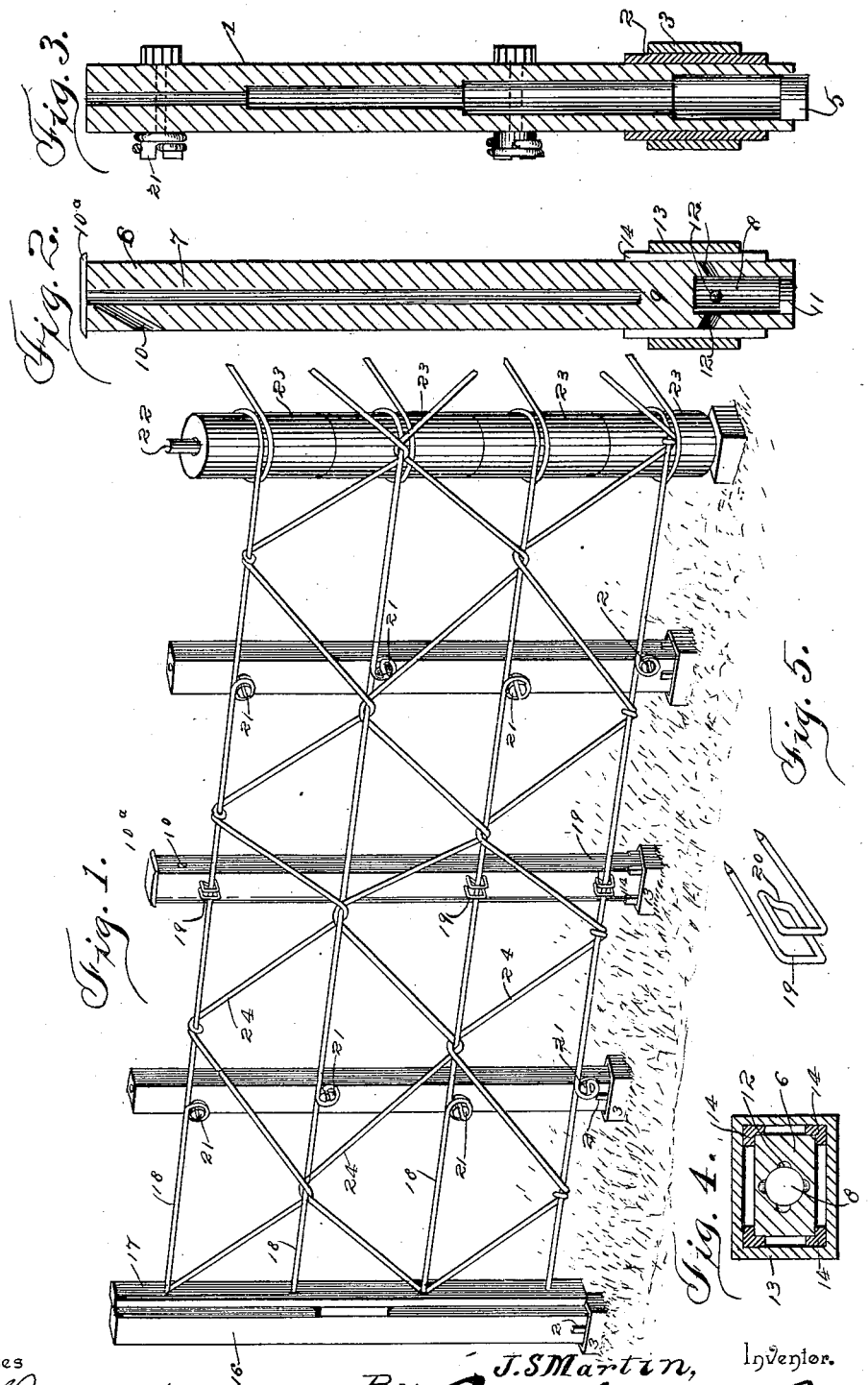

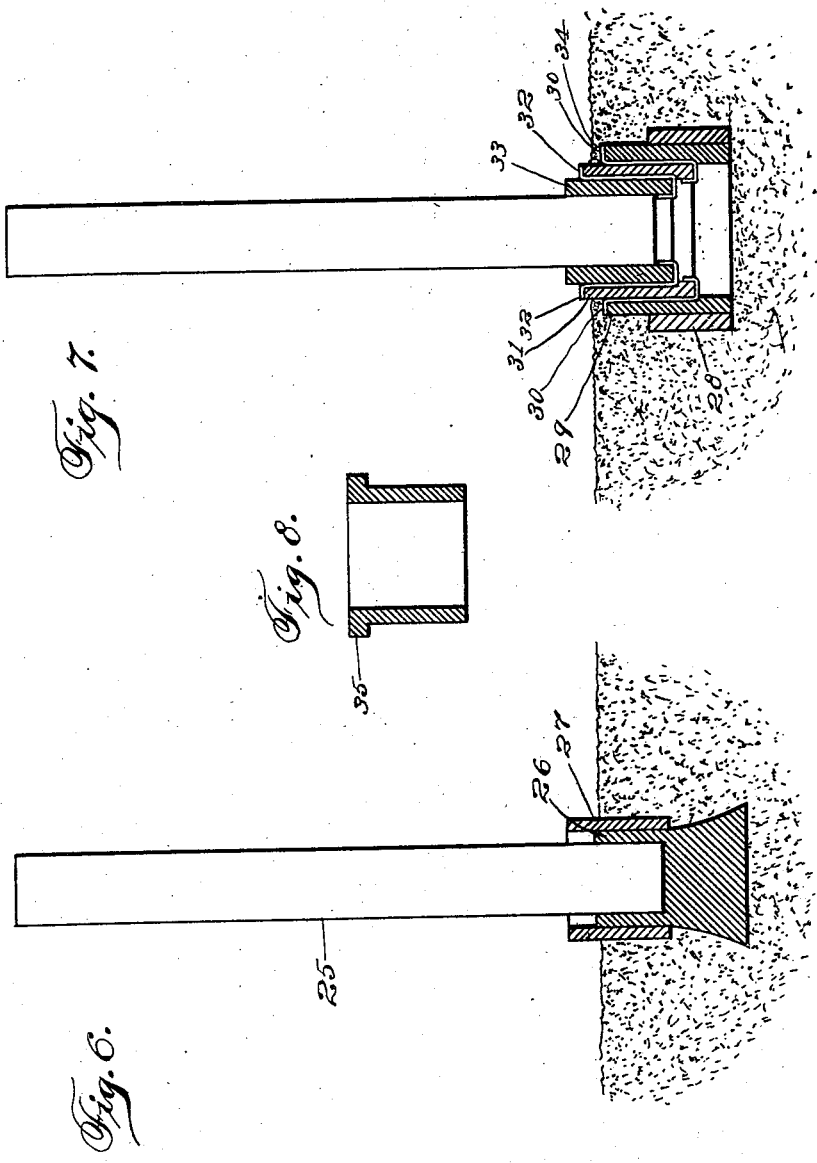

JOHN S. MARTIN, OF BAUGHMAN TOWNSHIP, OHIO.

FENCE.

SPECIFICATION forming part of Letters Patent No. 680,342, dated August 13, 1901.

Application filed November 6, 1900. Serial No. 35,641. (No model.)

*To all whom it may concern:*

Be it known that I, JOHN S. MARTIN, a citizen of the United States, residing in Baughman township, in the county of Wayne and State of Ohio, have invented a new and useful Fence, of which the following is a specification.

The invention relates to improvements in fences.

The objects of the present invention are to improve the construction of fences, more especially the construction of wooden fence-posts, and to enable a preservative to be applied to the same to increase the durability of a fence, and to provide a simple and inexpensive device adapted to protect a wooden fence-post at the surface of the ground where the greatest strength is required and capable of preventing a post from being forced upward out of the ground by the freezing thereof.

The invention consists in the construction and novel combination and arrangement of parts hereinafter fully described, illustrated in the accompanying drawings, and pointed out in the claims hereto appended.

In the drawings, Figure 1 is a perspective view of a portion of a fence constructed in accordance with this invention. Fig. 2 is a vertical sectional view showing the preferred form of fence-post. Fig. 3 is a similar view showing another form of fence-post. Fig. 4 is a horizontal sectional view. Fig. 5 is a detail view of the staple. Figs. 6 and 7 are vertical sectional views of fence-posts, illustrating modifications of the invention. Fig. 8 is a detail view illustrating a modification of the sleeves or sections.

Like numerals of reference designate corresponding parts in all the figures of the drawings.

1 designates a wooden fence-post provided on its exterior with vertical ribs 2, consisting, preferably, of cleats secured to the lower portion of the fence-post and adapted to space a sleeve 3 therefrom to provide intervening air-spaces between the sleeve and the post. The sleeve, which may be constructed of any suitable material, is loosely mounted on the lower portion of the post and is designed to extend downward from a point a few inches above the ground downward into the ground, below the freezing-point thereof, so that the ground in freezing and expanding will operate to move the sleeve upward on the post and not change the position of the post itself. The distance the sleeve extends into the ground is about a foot; but it may be increased in length in localities where the freezing of the ground extends below this distance. The sleeve, should it be forced upward by the ground in freezing, may be readily pushed back into position, and besides operating to prevent the position of the post from being changed by the freezing of the ground it also serves to prevent the soil at the surface of the ground from coming in contact with the post, whereby the latter is prevented from rapid decay and its durability greatly increased. Also the air is permitted to enter the intervening spaces between the sleeve and the fence-post, and moisture entering such spaces will soak into the ground at the bottom of the sleeve.

The fence-post 1 is provided with a longitudinal opening 4, tapering toward the top of the post and preferably formed by successive borings. The lower end of the bore is closed by a plug 5 to form a receptacle for a preservative, which may consist of coal-oil and water or any other suitable substance. The upper end of the bore is preferably left open, so that any water entering the bore will descend to the bottom thereof and pass below the oil, which floats on the surface of the water. The water is employed for the reason that it may be prevented from leaking out of the bottom of the post more readily than the oil, which is difficult to retain in the post if used alone. Furthermore, by arranging the oil over the water the leakage, if at all, will be of water and not of oil. The upper end of the bore may be closed, if desired, to prevent moisture from entering the post.

In Fig. 2 of the accompanying drawings is illustrated the preferred form of the invention, and the post 6 is provided with an upper bore 7 and a lower bore 8, an intermediate solid portion 9 being interposed between the bores and located at the surface of the ground to avoid weakening the post at this point, where the greatest strength is required. The upper bore, which is preferably about half an inch in diameter, extends downward from the top of the post to within a short distance from the surface of the ground and is designed to contain a suitable preservative, such as coal-oil, and the upper end of the bore is closed by a cap 10ª. The preservative is introduced into the upper longitudinal bore through an inclined transverse bore 10, extending downward and outward from a point near the top of the bore 7 and being preferably of greater diameter than the said bore 7 to facilitate the introduction of the preservative.

The lower bore 8, which is preferably about two inches in diameter, extends upward from the bottom of the post and terminates short of the upper longitudinal bore to leave the intermediate solid portion 9. The lower end of the lower bore may be closed by a plug 11, and when closed the bore is filled with a suitable preservative, preferably consisting of coal-tar and coal-oil, which is introduced through inclined perforations or bores 12, extending upward and outward and preferably arranged radially. These transverse bores or perforations permit the preservative to be readily introduced into the lower bore; but they are also adapted when the lower end of the lower bore is left open to permit water to flow through the lower portion of the post and soak into the ground at the bottom thereof for draining the space between the sleeve 13 and the post. The sleeve 13 is loosely arranged on the lower portion of the post and is spaced therefrom by ribs 14 and is adapted to operate similar to the sleeves heretofore described. The ribs which space the sleeves from the post are preferably located at the corners of the post, as illustrated in Fig. 4 of the accompanying drawings, as the transverse perforations or passages are preferably arranged diametrically of the post at points where a minimum amount of boring is required. The soil is prevented from coming in contact with the solid intermediate portion of the post, and the durability of the latter is greatly increased by the arrangement of the upper and lower bores and the said solid or intermediate portion 9. The tapering bore of the post 1 provides a large space at the lower end of the post for the reception of the preservative and reduces the size of the opening at the surface of the ground to increase the strength or lessen the weakening effect at this point. The posts are designed to be arranged as illustrated in Fig. 1 of the accompanying drawings, and the end post 16 is designed to be provided with an attachment-bar 17, forming an evener and centrally connected with the post by a block. The attachment-bar is adapted to yield to the strain on the horizontal fence-wires 18 to avoid changing the position of the post 16, which might otherwise be drawn out of plumb. The horizontal wires 18 are secured to intermediate posts by staples 19, composed of two legs and a connecting portion, which is coiled to form an eye 20 for the horizontal wires or runners. These wires or runners 18 are strung through the eyes 20, and should a staple be withdrawn from a post it cannot become accidentally separated from the fence-wire and lost. The wire-stretchers 21 are designed to be reversely arranged, so that each alternate one is located in the opposite direction from the next one to tighten the wire, whereby the strain on the fence-post is equalized to avoid twisting the same. The fence-post may be arranged at any desired intervals, and the wire-stretchers may be located at any point. The corner-post preferably consists of a spindle or shaft 22 and a series of spools 23, having the wires coiled around them and adapted to turn to facilitate stretching the wires. The shaft or spindle is mounted in a suitable post, which is embedded in the ground. The fence-wires are supported by a series of bracing-wires 24, composed of a series of approximately V-shaped bends and arranged to permit the horizontal wires to be depressed or flexed without bending the bracing-wires, whereby the horizontal wires are adapted to spring back into position automatically after the pressure has been removed.

In Fig. 6 of the accompanying drawings is illustrated a modification of the invention, in which the post 25 is arranged within a socket 26, constructed of burnt clay or malleable iron or any other suitable material. The socket, which is preferably rectangular in horizontal section, conforms to the configuration of the lower portion of the post, extends downward from the surface of the ground to the desired depth, and in order to prevent it from being lifted out of the ground by the freezing of the latter a vertically-movable sleeve 27 is provided. The sleeve 27, which is rectangular, is loosely mounted on the socket and extends above the surface of the ground. When the ground freezes, the sleeve will move vertically and the post will remain solidly in position.

In Fig. 7 of the drawings is illustrated another modification in which a series of rectangular sleeves or sections is employed, and these sleeves or sections are adapted to be moved vertically by the freezing of the ground and are capable of dropping downward or backward when the ground thaws. The lowermost or outer sleeve 28 is arranged at the bottom, and the adjacent sleeve 29 extends above the sleeve 28 and is provided with a pair of supporting-hooks 30, adapted to receive and hold a sleeve 31 in an elevated position to prevent the said sleeve 31 from telescoping too far into the sleeve 29. The sleeve 31 is also provided with hooks 32 to support the innermost sleeve 33, which extends above the sleeve 31 and which receives the post. The hooks consist of substantially U-shaped body portions having outwardly-extending arms arranged in grooves of the upper edges of the sleeves or sections. The arms 34 of the hooks are of substantially the same length as the thickness of the sleeve or sections to which they are applied; but instead of providing hooks the sleeves may be provided with exterior shoulders 35, as illustrated in Fig. 8 of the accompanying drawings.

The socket shown in Fig. 6 is designed to be filled with a suitable preservative; but the bores or openings are omitted in the posts illustrated in Figs. 6 and 7.

It will be seen that the post is simple and comparatively inexpensive in construction, that its strength, durability, and stability are increased, and that it is prevented from coming in contact with the soil at the surface thereof. It will also be apparent that the sleeve prevents the post from being forced out of the ground by the freezing thereof and that the sleeve may be readily pushed back into position.

What I claim is—

1. The combination of a wooden fence-post provided with upper and lower longitudinal bores and having an intermediate solid portion and provided with transverse perforations located beneath the surface of the ground and communicating with the lower longitudinal bore, vertical ribs arranged at the lower portion of the post and offset from the said perforations, and a sleeve loosely supported by the ribs and adapted to shield the transverse perforations, substantially as described.

2. The combination of a wooden post provided with a longitudinal bore and having transverse perforations communicating with the bore and located below the surface of the ground, said post being rectangular in cross-section and provided at the surface of the ground with a solid portion, the vertical strips secured to the post at the corners thereof and offset from the transverse perforations, and a sleeve supported by the ribs and forming a shield for the perforations, substantially as described.

3. A wooden fence-post provided with upper and lower longitudinal bores adapted to contain a preservative, said post being provided between the bores with an intermediate solid portion designed to be located at the surface of the ground, substantially as described.

4. The combination of a wooden fence-post provided at its bottom with a longitudinal bore and having a transverse perforation communicating with the bore at the upper portion thereof, said post being provided at the surface of the ground with a solid portion, a removable plug fitting in the bore, and a sleeve surrounding the post at the lower portion thereof and spaced from the same at the transverse perforation and forming a shield for the latter, substantially as described.

5. The combination of a wooden fence-post having a solid portion at the surface of the ground and provided at its bottom with a longitudinal bore and having an inclined perforation or passage at the upper portion of the bore, said inclined passage extending downward and inward, and a sleeve surrounding the post and spaced therefrom at the transverse or inclined perforation or passage and forming a shield for the latter, substantially as described.

In testimony that I claim the foregoing as my own I have hereto affixed my signature in the presence of two witnesses.

JOHN S. MARTIN.

Witnesses:
E. G. WILLISON,
R. L. OBERLIN.